United States Patent
Hadas et al.

(10) Patent No.: US 10,628,200 B2
(45) Date of Patent: Apr. 21, 2020

(54) BASE STATE FOR THIN-PROVISIONED VOLUMES

(71) Applicant: Red Hat Israel, Ltd., Ra'anana (IL)

(72) Inventors: Arik Hadas, Herzliya (IL); Maor Lipchuk, Tel-Aviv (IL)

(73) Assignee: Red Hat Israel, Ltd., Ra'anana (IL)

( * ) Notice: Subject to any disclaimer, the term of this patent is extended or adjusted under 35 U.S.C. 154(b) by 105 days.

(21) Appl. No.: 15/801,465

(22) Filed: Nov. 2, 2017

(65) Prior Publication Data
US 2019/0129740 A1    May 2, 2019

(51) Int. Cl.
*G06F 9/455*    (2018.01)
*G06F 5/14*    (2006.01)

(52) U.S. Cl.
CPC ............ *G06F 9/45558* (2013.01); *G06F 5/14* (2013.01); *G06F 2009/4557* (2013.01); *G06F 2009/45562* (2013.01); *G06F 2009/45583* (2013.01)

(58) Field of Classification Search
CPC ....... G06F 9/45558; G06F 2009/45583; G06F 2009/45575; G06F 2009/45579; G06F 2009/45562; G06F 5/14
See application file for complete search history.

(56) References Cited

U.S. PATENT DOCUMENTS

| | | | |
|---|---|---|---|
| 8,065,272 B2 | 11/2011 | Stringham | |
| 8,250,284 B2 | 8/2012 | Nakamichi et al. | |
| 9,135,049 B2 | 9/2015 | Mizrahi et al. | |
| 9,542,111 B2 | 1/2017 | Wu | |
| 9,575,991 B2 | 2/2017 | Ghosh et al. | |
| 2006/0005189 A1* | 1/2006 | Vega | G06F 9/4856 718/1 |
| 2009/0327626 A1* | 12/2009 | Kaushik | G06F 11/1466 711/162 |
| 2010/0199040 A1* | 8/2010 | Schnapp | G06F 3/0605 711/114 |
| 2010/0299491 A1* | 11/2010 | Ueda | G06F 3/0613 711/162 |

(Continued)

OTHER PUBLICATIONS

VMare vSphere 5.1 Documentation Center; Virtual Disk Thin Provisioning; https://pubs.vmware.com/vsphere-51/index.isp?topic=%2Fcom.vmware.vsphere.storage.doc%2FGUID-8204A8D7-25B6-4DE2-A227-408C158A31DE.htm; retrieved Aug. 31, 2017 (1 page).

(Continued)

*Primary Examiner* — Tuan C Dao
(74) *Attorney, Agent, or Firm* — K&L Gates LLP

(57) ABSTRACT

In an example, a method includes copying a base state of a virtual machine from a source volume to a destination volume, the destination volume having a physical capacity and a virtual capacity, the virtual capacity being larger than the physical capacity, and including a plurality of storage blocks. The method further includes, in response to an instruction to write data to the destination volume, writing the data to at least a first storage block in the plurality of storage blocks and setting a primary flag included in metadata stored on the destination volume from a first state to a second state, where the primary flag is associated with the first storage block. The method further includes subsequently reading a state of the primary flag to determine that data in the first storage block no longer form part of the base state of the virtual machine.

20 Claims, 5 Drawing Sheets

(56) References Cited

U.S. PATENT DOCUMENTS

| | | | |
|---|---|---|---|
| 2012/0110574 A1* | 5/2012 | Kumar | G06F 9/45558 718/1 |
| 2014/0052892 A1* | 2/2014 | Klein | G06F 12/0246 711/103 |
| 2015/0229717 A1* | 8/2015 | Gupta | H04L 67/34 718/1 |
| 2015/0378761 A1* | 12/2015 | Sevigny | G06F 9/45558 718/1 |
| 2016/0350006 A1 | 12/2016 | Wang et al. | |

OTHER PUBLICATIONS

IBM Spectrum Virtualize Software 7.7.1; Thin provisioned volumes; https://www.ibm.com/support/knowledgecenter/STVLF4_7.7.1/spectrum.virtualize.771.doc/svc_spaceefficentvdisks_3r7ayd.html; retrieved Aug. 31, 2017; (3 pages).

* cited by examiner

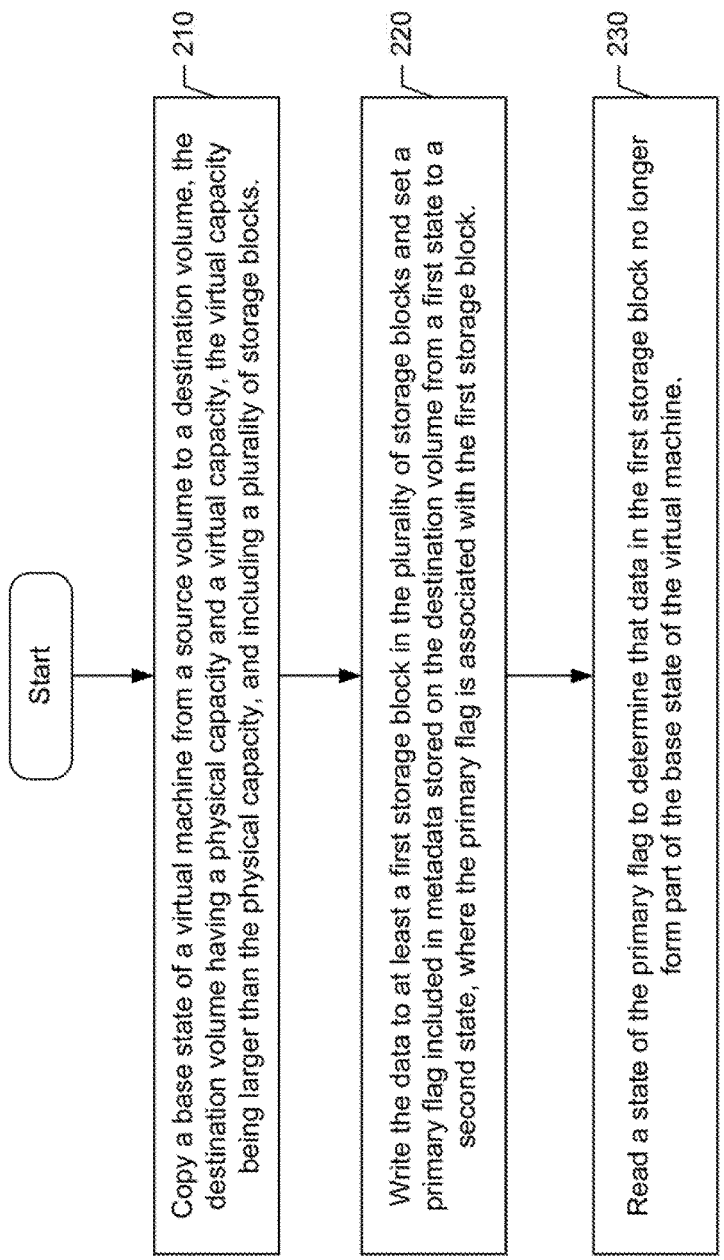

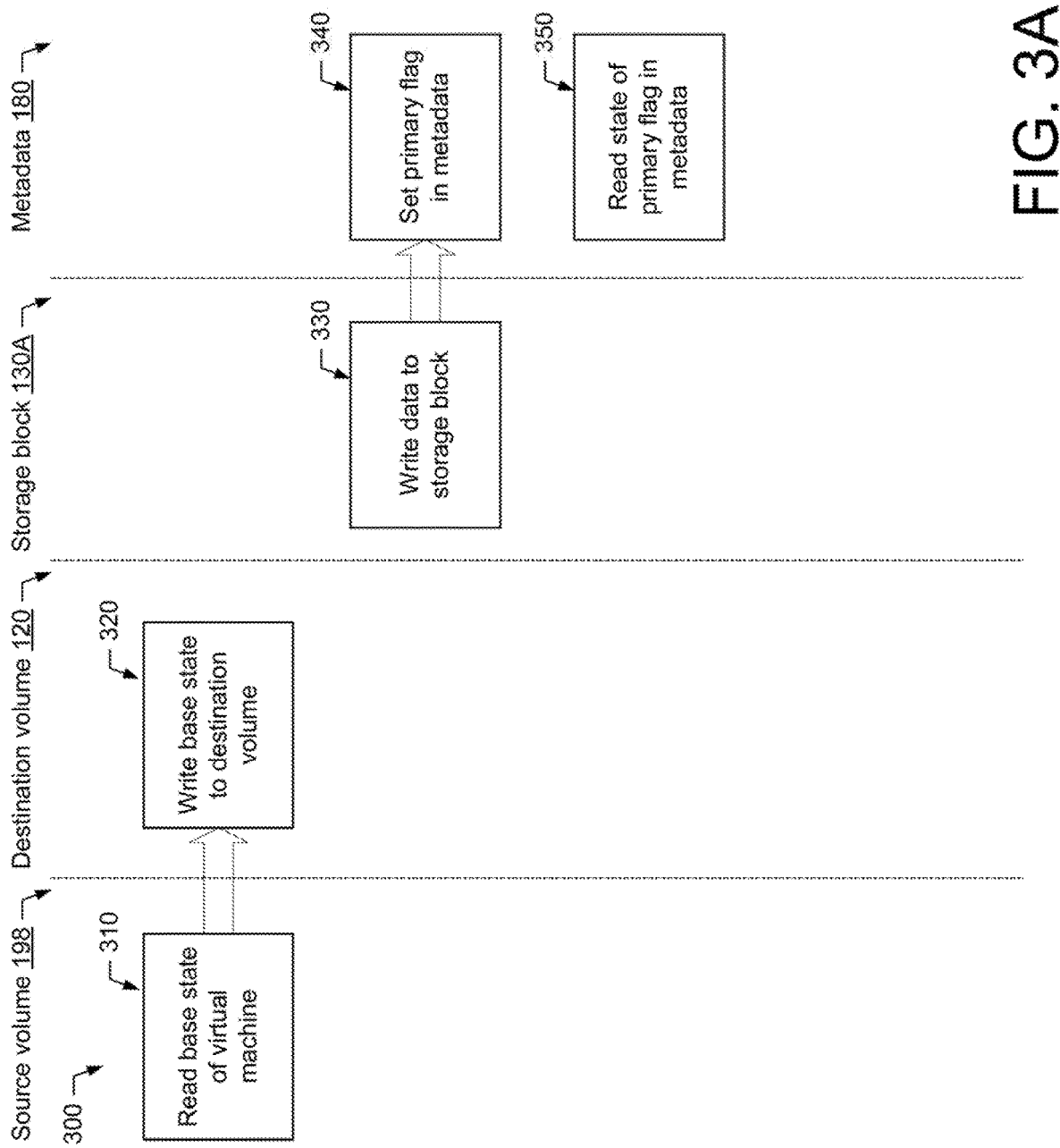

BASE STATE FOR THIN-PROVISIONED VOLUMES

BACKGROUND

A virtual disk may be stored on a disk volume that has been thin-provisioned. A thin-provisioned volume has a physical capacity and a virtual capacity, the virtual capacity being larger than the physical capacity, and provides a space efficient way of storing data. A thin-provisioned volume may, in particular, be used to store in a compact form a copy of a base volume that contains the base state of a virtual machine. After the copy has been created, data on the thin-provisioned volume may subsequently be modified and additional new data may be written to the volume causing it to become inconsistent with the original virtual machine base state.

SUMMARY

The present disclosure provides new and innovative systems and methods for storing copies of virtual machine base states using thin-provisioned volumes. In an example, a system includes a storage device with at least one volume, the at least one volume having a physical capacity and a virtual capacity, the virtual capacity being larger than the physical capacity, and a plurality of storage blocks. Each storage block in the plurality of storage blocks is configured to store a copy of at least part of a base state of a virtual machine. The system further includes a processor in communication with the storage device, and metadata stored on the at least one volume. The metadata includes a plurality of primary flags. Each primary flag in the plurality of primary flags is associated with at least one individual storage block in the plurality of storage blocks and is set initially to a first state that signifies that data stored on the relevant individual storage block form at least part of the base state of the virtual machine. The processor is configured such that, in response to an instruction to write data to the at least one volume, the processor executes to write the data to at least a destination block in the plurality of storage blocks and to set a relevant primary flag in the plurality of primary flags that is associated with the destination block to a second state that signifies that data stored on the destination block no longer form part of the base state of the virtual machine.

In an example, a method includes copying a base state of a virtual machine from a source volume to a destination volume, the destination volume having a physical capacity and a virtual capacity, the virtual capacity being larger than the physical capacity, and including a plurality of storage blocks. The method further includes, in response to an instruction to write data to the destination volume, writing the data to at least a first storage block in the plurality of storage blocks and setting a primary flag included in metadata stored on the destination volume from a first state to a second state, where the primary flag is associated with the first storage block. The method further includes subsequently reading a state of the primary flag to determine that data in the first storage block no longer form part of the base state of the virtual machine.

In an example, a computer-readable non-transitory medium storing executable instructions, which when executed by a computer system, cause the computer system to copy a base state of a virtual machine from a source volume to a destination volume, the destination volume having a physical capacity and a virtual capacity, the virtual capacity being larger than the physical capacity, and including a plurality of storage blocks. In response to an instruction to write data to the destination volume, data is then caused to be written to at least a first storage block in the plurality of storage blocks and a primary flag included in metadata stored on the destination volume is caused to be set from a first state to a second state, the primary flag being associated with the first storage block. A state of the primary flag is then caused to be subsequently read to determine that data in the first storage block no longer form part of the base state of the virtual machine.

Additional features and advantages of the disclosed systems and methods are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE FIGURES

FIG. 2 illustrates a flowchart of an example method for storing a copy of a virtual machine base state on a destination volume according to an example embodiment of the present disclosure.

FIGS. 3A and 3B illustrate flow diagrams of an example method for storing a copy of a virtual machine base state on a destination volume according to an example embodiment of the present disclosure.

DETAILED DESCRIPTION OF EXAMPLE EMBODIMENTS

Figure 1:
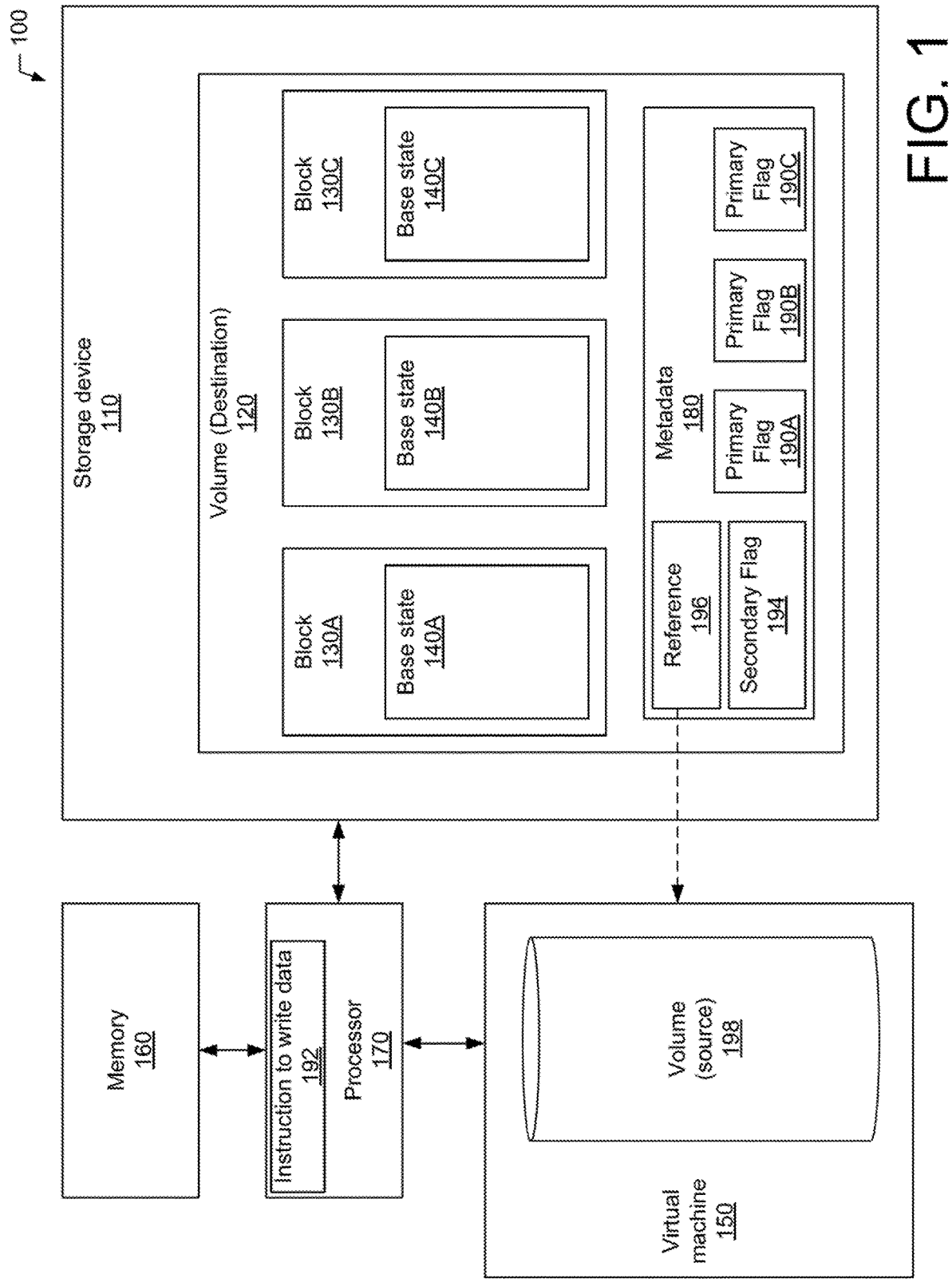
FIG. 1 illustrates a block diagram of an example system for storing a copy of a virtual machine base state according to an example embodiment of the present disclosure.

Techniques are disclosed for storing copies of virtual machine base states using thin-provisioned volumes. A thin-provisioned volume has a physical capacity and a virtual capacity, the virtual capacity being larger than the physical capacity, and provides a space efficient means for storing a variety of different data types and structures, including virtual disks. Virtual disk image data may be stored on thin-provisioned volumes in a variety of different file formats. The commercially available Qcow2 file format is one such example. Thin-provisioned volumes are typically designed such that they are initially empty and when virtual disk data is written to the volume, metadata stored on the volume is updated to keep a record of the data written and stored.

A thin-provisioned volume can, in particular, be used to store the base volume of a virtual machine disk in compact form. In these cases, the volume is typically created as a clone of a disk of a template virtual machine that contains a base state of the virtual machine. Once created, data stored on the volume may subsequently be modified and additional new data may be written to the volume causing it to become inconsistent with the original virtual machine base state. In various situations, it may be useful to determine whether or not particular data stored on the volume form part of the virtual machine base state at any point in time. For example, when data stored on the volume need to be migrated to a target storage device, if the target device contains the virtual machine base state then it may only be necessary to copy data on the volume not forming part of the virtual machine base state to the target device, for example, advantageously reducing networking traffic, processing time, and migration latency. The copied data may then be merged with the virtual machine base state on the target device to complete the migration. Another example scenario is when data on the thin-provisioned volume are being re-based onto the original virtual machine disk that the volume was cloned from.

It is a challenge with typical thin-provisioned volumes to efficiently determine whether or not data stored on the volume form part of the virtual machine base state. Generally, making such a determination involves taking a brute force approach whereby each relevant block of data is individually read and compared with the virtual machine base state. Typically, this is relatively slow to perform computationally and consumes valuable processing time.

The present disclosure provides an improved system for storing copies of virtual machine base states on thin-provisioned volumes by extending the file formats commonly used on such volumes. The disclosure provides a fast and efficient process for determining whether or not data stored on a thin-provisioned volume form part of the virtual machine base state after the data have been modified on the volume. This is achieved by extending the metadata stored on the volume to include a flag (for example, a 1-bit flag) for each block of data stored on the volume. Each flag is configured to indicate whether or not data in the relevant block form part of the original disk that the volume was cloned from. When a virtual machine disk is being cloned to the volume (for example, using a commercially available tool such as Qemu-img Convert), the flags corresponding to blocks on the volume that data are written to are set initially, for example, to 0. Thereafter, for every subsequent write of data to the volume, the flags corresponding to the relevant blocks that data are written to are set to 1. These flags may be used to quickly and efficiently determine whether or not data stored on blocks form part of the virtual machine base state. For example, a process may be executed that iterates through all of the flags and reads their current states. If a flag is set to 1, then the process may determine that the block corresponding to the flag no longer necessarily contains data forming part of the virtual machine base state. If the flag is 0, then the process may determine that the block does contain data necessarily forming part of the virtual machine base state.

In addition to storing copies of virtual machine base states, thin-provisioned volumes may be used to store and manage a variety of other data types and structures. For example, they may be used to store disk snapshots. Disk snapshots do not require a facility for tracking differences between the copied and original data sets. Therefore, to minimize the size of metadata stored on thin-provisioned volumes in these use cases, the present disclosure further provides that the metadata may also include a single global flag for each volume that is used to signify that the metadata include the 1-bit flags, as described above. The value (e.g., 1) of the global flag signifies to an executable process that it may use the 1-bit flags to distinguish the base state from the non-base state. In an example, from a certain version onward, the global flag is assumed to exist, and the processor checks whether the global flag is set or not.

The present disclosure further provides that the metadata stored on the thin-provisioned volume may also include a reference to the original disk that the clone was created from. The reference may be used by an executable process to keep track of the original disk in a fast and efficient manner. The reference may, advantageously, be added to the metadata without necessarily increasing the size of the metadata. For example, thin-provisioned volumes generally keep a reference to their backing file in the metadata. This reference is irrelevant for base volumes, because they do not have backing files, so the space used for this reference may be re-used to refer to the original disk that the clone was created from. The reference may be added to the metadata, or set in the metadata, when the global flag is added to the metadata.

FIG. 1 depicts a high-level component diagram of an example system 100 in accordance with one or more aspects of the present disclosure. The system 100 may include a storage device 110 with at least one volume 120, the at least one volume 120 having a physical capacity and a virtual capacity, the virtual capacity being larger than the physical capacity, and a plurality of storage blocks 130A-C. Each storage block in the plurality of storage blocks 130A-C may be configured to store a copy of at least part of a base state 140A-C of a virtual machine 150. In the example, the system 100 may also include a memory 160 and a processor 170, the processor 170 being in communication with the memory 160 and storage device 110, and metadata 180 stored on the at least one volume 120.

The metadata 180 may include a plurality of primary flags 190A-C. Each primary flag in the plurality of primary flags 190A-C may be associated with at least one individual storage block in the plurality of storage blocks 130A-C and may be set initially to a first state that signifies that data stored on the relevant individual storage block 130A-C form at least part of the base state 140A-C of the virtual machine 150.

In the example, in response to an instruction to write data 192 to the at least one volume 120, the processor 170 may execute to write the data to at least a destination block 130A in the plurality of storage blocks 130A-C and set a relevant primary flag 190A in the plurality of primary flags 190A-C that is associated with the destination block 130A to a second state that signifies that data stored on the destination block 130A no longer form part of the base state 140A-C of the virtual machine 150.

As used herein, processor 170 refers to a device capable of executing instructions encoding arithmetic, logical, and/or I/O operations and includes both a physical and a virtual processor. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 160 refers to a volatile or non-volatile memory device, such as RAM, ROM, EEPROM, or any other device capable of storing data.

For simplicity, in the example system 100 depicted in FIG. 1 illustrates a volume 120 that includes a total of three storage blocks 130A-C and the metadata 180 includes three primary flags 190A-C corresponding to the three storage blocks 130A-C respectively. In other typical examples, the volume(s) 120 may have a large storage capacity and the system 100 may, accordingly, include a significantly higher number of storage blocks 130A-C and primary flags 190A-C. For example, the volume 120 may have a storage capacity of 100 gigabytes (GB) and contain a total of 1,638,400 storage blocks 130, each block 130 having an individual storage capacity of 64 kilobytes (KB). Accordingly, the metadata 180 may include a total of 1,638,400 primary flags 190 corresponding to the 1,638,400 storage blocks 130. The primary flags 190 may be implemented using 1-bit primary flags 190 stored using a standalone table data structure in the metadata 180. The table of 1-bit primary flags 190 may, collectively, consume a total of approximately 200 KB in the metadata 180 and, therefore, occupy four storage blocks of the volume 120.

In other examples, the data sets and fields that are commonly included as standard in the metadata 180 used in thin-provisioned volume(s) 120 may be re-used to store the primary flags 190. For example, the entries commonly included in the metadata 180 that point to each of the storage blocks 130 may be re-used. For example, if the volume(s) 120 is formatted according to the Qcow2 file format, then the bits included in the L2 entry tables required by Qcow2 may be re-used to store the primary flags 190A-C, in a similar way to the bits commonly reserved for the "copied" and "compressed" flags of Qcow2. In this example approach, the primary flags 190, advantageously, do not require any storage in addition to storage consumed by the metadata 180 of Qcow2 as standard. However, the trade off is that the volume(s) 120 is not able to support data compression. In another example, if the volume(s) 120 conforms to a file format that supports internal snapshots (such as Qcow2) then the table that is typically included in such formats containing reference counts for each of the storage blocks 130 may be re-used. For example, if the volume(s) 120 is formatted according to Qcow2, then a single bit of each 16 bit reference counter included in Qcow2 for each storage block 130 may be used as a primary flag 190. This example approach also, advantageously, does not require any storage in addition to the storage already consumed by the standard metadata 180 to store the primary flags 190. However, the trade off is that the maximum number of references that may be recorded in the metadata 180 per storage block 130 is reduced. For example, if the volume(s) 120 is formatted according to Qcow2, then the maximum number of references per storage block 130 is reduced from $2^{16}$ to $2^{15}$. From a practical perspective, however, this trade off may be reasonable.

The processor 170 may further execute to copy data stored on the storage blocks 130A-C that no longer form part of the virtual machine 150 base state to one or more external computing devices or storage volumes. For example, in response to a copy instruction the processor 170 may execute to copy data stored on at least a first storage block 130A in the plurality of storage blocks 130A-C to a target storage volume (not shown) where a primary flag 190A in the plurality of primary flags 190A-C associated with the first storage block 130A is set to the second state. The target volume may be in communication with the processor 170. For example, the target volume may be a physical or virtualized storage device in communication with the processor 170 via a physical or virtualized internal communications bus or computer network.

The metadata 180 of the system 100 may further include a secondary flag 194 configured to indicate that the metadata 180 include the plurality of primary flags 190A-C. The existence of the secondary flag 194 may indicate to executable processes that the plurality of primary flags 190A-C are available and may be used to distinguish between the data stored on the storage blocks 130A-C and the base state of the virtual machine 150. For example, in response to the instruction to write data 192 to the volume 120, the processor 170 may further execute to perform a lookup operation to determine that the metadata 180 include the secondary flag 194 having a predetermined value (e.g, 1) before writing the data to the volume 120. Subsequently, in response to an instruction to copy data on the volume 120 not forming part of the base state to the target volume, the processor 170 may further perform a lookup operation to confirm that the metadata 180 include the secondary flag 194 having the predetermined value (e.g., 1) before attempting to read the states of the primary flags 190A-C in the metadata 180 and perform the copy operation.

The metadata 180 of the system 100 may further include a reference 196 that identifies a source volume 198 containing the original base state of the virtual machine 150. The reference 196 may be a physical or virtual address of the source volume 198 or similar reference pointer.

FIG. 2 illustrates a flowchart of an example method 200 in accordance with an example embodiment of the present disclosure. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, and some of the blocks described are optional. The method 200 may be performed by processing logic that may include hardware (circuitry, dedicated logic, etc.), software, or a combination of both.

The example method 200 includes copying a base state of a virtual machine from a source volume to a destination volume being thin-provisioned and including a plurality of storage blocks (block 210). For example, the method 200 may include copying data stored on the source volume 198 that includes the base state of a virtual machine 150 disk. The destination volume 120, being thin-provisioned, may have a physical capacity and a virtual capacity, the virtual capacity being larger than the physical capacity, and may be formatted in accordance with a suitable commercially available file format, such as the Qcow2 file format.

The method 200 may further include writing data to at least a first storage block in the plurality of storage blocks of the destination volume and setting a primary flag included in metadata stored on the destination volume from a first state to a second state, the primary flag being associated with the first storage block (block 220). For example, the method 200 may include writing data to the first storage block 130A in response to an instruction to write the data to the destination volume 120. Also, for example, in response to an instruction to write the data to the destination volume 120, a primary flag 190A which is in metadata 180 stored on the destination volume 120 is set from a first state (e.g., 0) to a second state (e.g., 1), the primary flag being associated with the first storage block 130A. In one example, the method 200 may include writing new data to the first storage block 130A in addition to existing data that are already stored on the first storage block 130A.

When setting the state of the associated primary flag 190A, the method 200 may include setting a Boolean datatype in the metadata 180, which represents the associated primary flag 190A, from a state of false to true. The Boolean datatype may, for example, be a binary datatype having a value of either zero or one. The binary datatype may, for example, be a 1-bit binary datatype stored in a single byte of the metadata 180.

The associated primary flag 190A, being set in the second state, signifies that the data included in the first storage block 130A have been modified and no longer reflect the base state of the virtual machine 150. In one example, the primary flag 190A may be set to the second state before or after the data are written to the first storage block 130A. In one example, the primary flag 190A may be set to the second state simultaneously with the data being written to the first storage block 130A.

The method 200 may further include reading a state of the associated primary flag to determine that data in the first storage block no longer form part of the base state of the virtual machine (block 230). For example, a process executing on the processor 170 may need to migrate data stored on the destination volume 120 to a target storage device (not shown) containing data reflecting the base state of the virtual machine 150. A fast and efficient migration may be achieved by copying only data (e.g., copy all changed sectors) on the destination volume 120 that do not form part of the virtual machine 150 base state. The process may iterate through the primary flags 190A-C and read their states in order to determine whether or not data on the corresponding storage blocks 130A-C reflect the base state. For example, on reading the state of primary flag 190A, the process may determine that data stored on corresponding destination block 130A do not form part of the base state of virtual machine 150 and, therefore, must be copied to the target volume. The copied data may be combined with the virtual machine 150 base state on the target device to form a merged dataset, thus completing the migration.

FIG. 3A illustrates a flow diagram of an example method 300. Although the example method 300 is described with reference to the flowchart illustrated in FIG. 3A, it will be appreciated that many other methods of performing the acts associated with the method 300 may be used. For example, the order of some of the blocks may be changed, certain blocks may be combined with other blocks, and some of the blocks described are optional.

The method 300 includes reading the base state of a virtual machine 150 from a source volume 198 (block 310) and writing the data comprising the base state to a destination volume 120 (block 320). For example, the source volume 198 may include data comprising the base state of a virtual machine 150 disk and may be copied to the destination volume 120 using a commercially available tool or executable script such as, for example, Qemu-img Convert.

The method 300 may further include writing data to a first storage block 130A in a plurality of storage blocks 130A-C included on the destination volume 120 (block 330). For example, the method 300 may include modifying existing data already stored on the first storage block 130A. For example, the method may include modifying the values of one or more parameters, variables or operational data that comprise the virtual machine 150 base state stored on the first storage block 130A.

The method may further include setting a primary flag 190A included in metadata 180 stored on the destination volume 120 from a first state to a second state (block 340). For example, the method may include setting a primary flag 190A in a plurality of primary flags 190A-C in the metadata 180, where the primary flag 190A is associated with the first storage block 130A, in order to signify that, as a result of data being modified on the first storage block 130A, the first storage block 130A no longer reflects the base state of the virtual machine 150. In another example, a new storage block may be created in destination volume 120, and the metadata of the new storage block is created with a primary flag initially set to the second state because the new storage block is not part of the base state of the virtual machine 150. Thus, a primary flag may be set in the first state or the second state depending on whether the storage block is part of a virtual machine base state.

The method may further include subsequently reading a state of the primary flag 190A in the metadata 180 (block 350). For example, a process executing on a processor 170 may operate to re-base data stored on the destination volume 120 back onto the source volume 198. A fast and efficient re-base operation may be performed by copying only data on the destination volume 120 that do not form part of the virtual machine 150 base state. The process may iterate through the primary flags 190A-C and read their states in order to determine whether or not data on the corresponding storage blocks 130A-C reflect the base state. For example, on reading the state of primary flag 190A, the process may determine that data stored on corresponding storage block 130A do not form part of the base state and, therefore, must be copied to the source volume 198. The copied data may be used to create a delta volume with the changed data of virtual machine 150 whose backing file is the source volume 198 to complete the re-base.

Figure 3B:
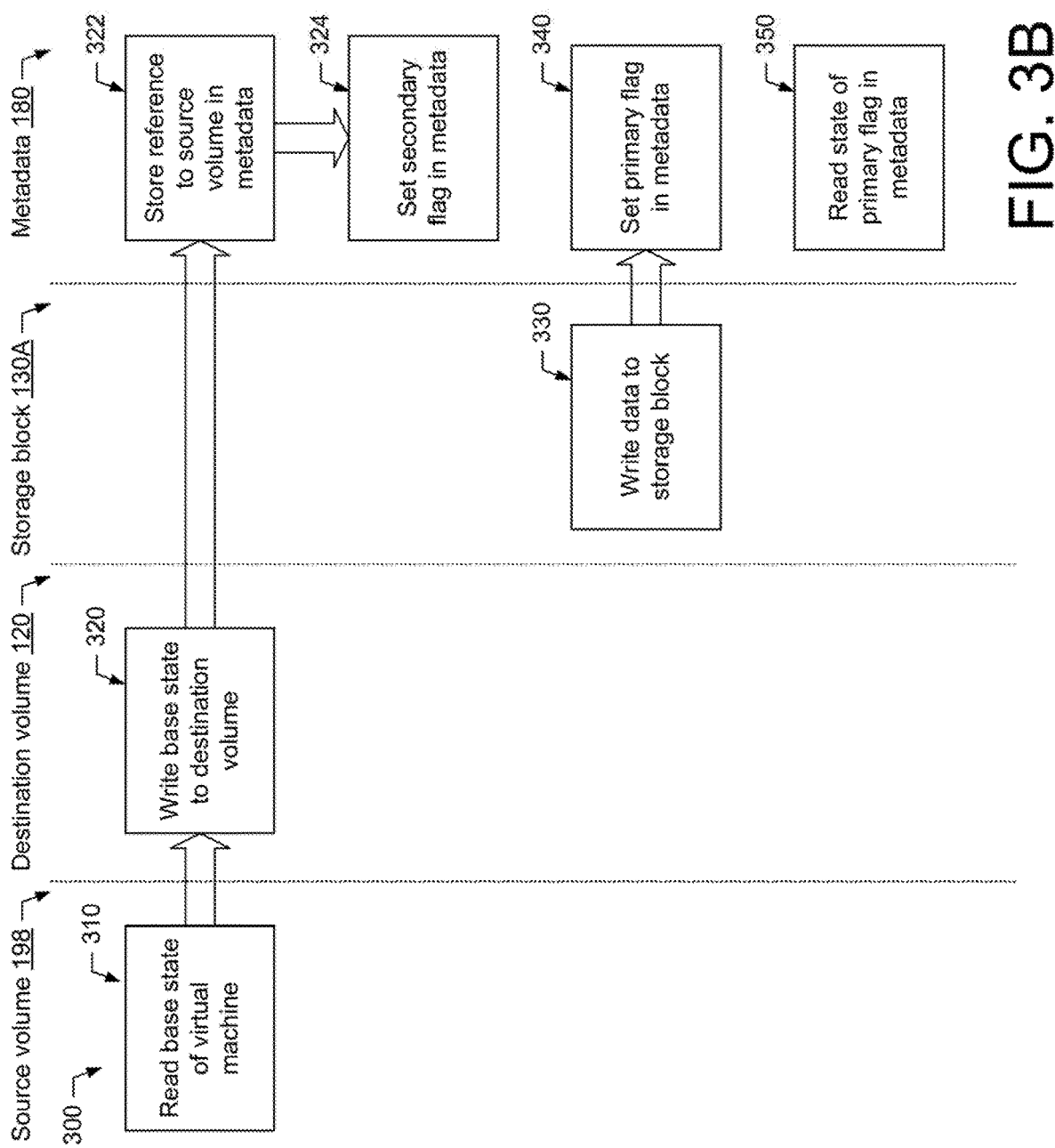

Referring to FIG. 3B, the method 300 may further include storing a reference 196 to the source volume 198 in the metadata 180 (block 322) to keep a record of where the copy of the base state on the destination volume 120 originated from. The reference may include any suitable data type or data structure that serves as a reference pointer and can be used by executable processes to identify the source volume 198. For example, the reference may include a physical or virtual address of the source volume 198. In the example method 300, the reference 196 may be stored in the metadata 180 after the data comprising the base state of the virtual machine 150 has been written to the destination volume 120 (block 320). In other examples, the reference 196 may be stored in the metadata 180 before or at the same time as when the base state is written to the destination volume 120 (block 320).

The method 300 may further include setting a secondary flag 194 included in the metadata 180 to signify that the metadata 180 includes the plurality of primary flags 190A-C (block 324). The secondary flag 194 may serve as an indicator to executable processes that they may access and use the primary flags 190A-C to determine if data stored on the destination volume 120 necessarily reflects the base state of the virtual machine 150. An executable process may, therefore, determine in a fast and efficient manner whether or not the destination volume 120 is suitable for storing virtualized resources and data structures that do not necessarily require a facility for tracking differences between cloned and original data sets. For example, if an executable process detects that the secondary flag 194 does not indicate that primary flags 190A-C exist in the metadata 180, then the process may determine that the destination volume 120 is suitable for storing disk snapshots.

Figure 4:
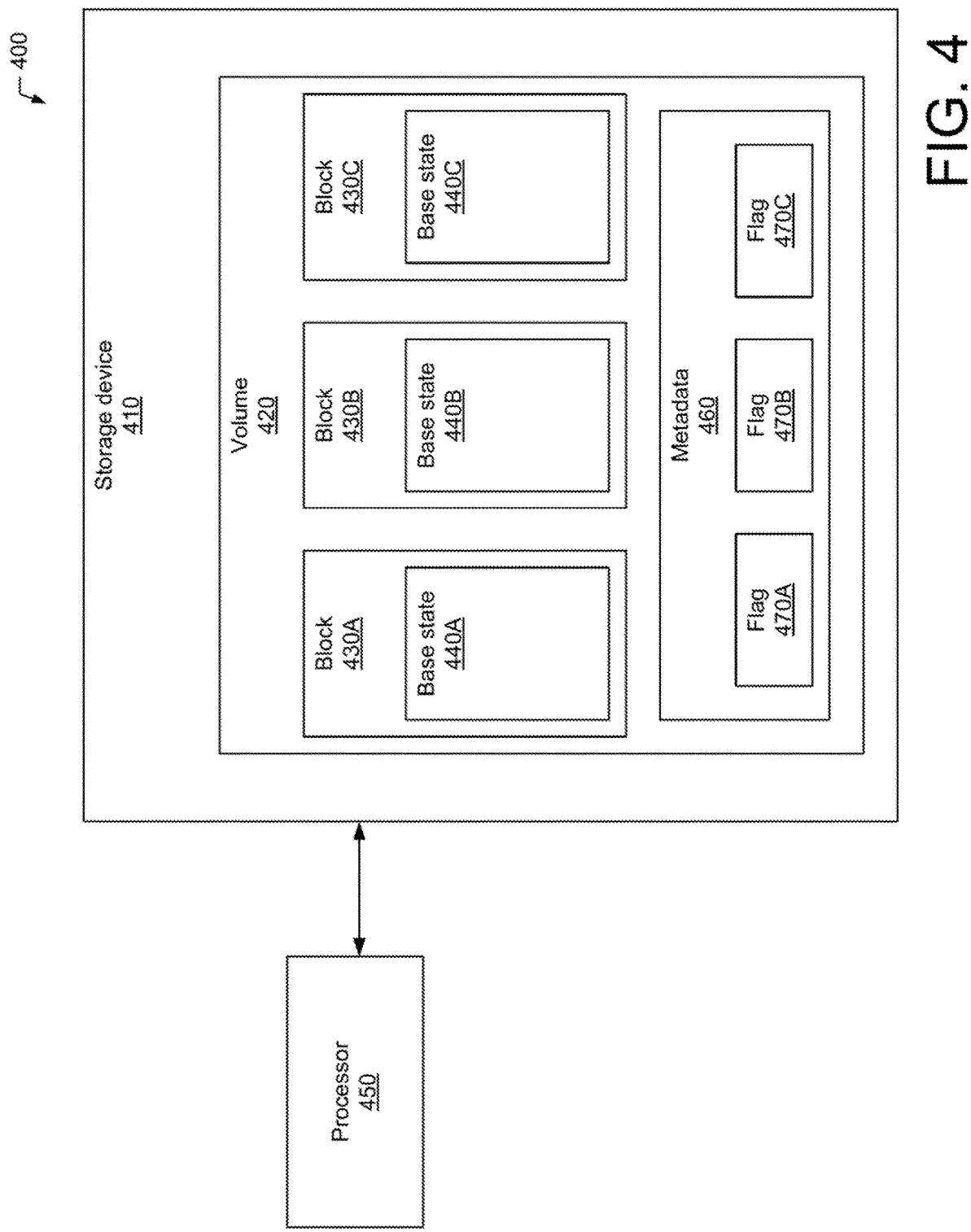
FIG. 4 illustrates a block diagram of an example system for storing a copy of a virtual machine base state according to an example embodiment of the present disclosure.

FIG. 4 depicts a high-level component diagram of a further example system 400 in accordance with one or more aspects of the present disclosure. The example system 400 includes a storage device 410 with at least one volume 420, the at least one volume 420 having a physical capacity and a virtual capacity, the virtual capacity being larger than the physical capacity, and a plurality of storage blocks 430A-C.

Each storage block in the plurality of storage blocks 430A-C may be configured to store a copy of at least part of a base state 440A-C of a virtual machine. In the example, the system 400 may also include a processor 450 in communication with the storage device 410 and metadata 460 stored on the at least one volume 420. The metadata 460 may include a plurality of primary flags 470A-C. Each primary flag in the plurality of primary flags 470A-C may be associated with at least one individual storage block in the plurality of storage blocks 430A-C and may be set initially to a first state that signifies that data stored on the relevant individual storage block 430A-C form at least part of the base state of the virtual machine.

The processor 450 may execute to write data to at least a destination block 430A in the plurality of storage blocks 430A-C and set a relevant primary flag 470A in the plurality of primary flags 470A-C that is associated with the destination block 430A to a second state that signifies that data stored on the destination block 430A no longer form part of the base state of the virtual machine.

The systems and methods disclosed herein are inextricably tied to, and provide a significant improvement to, computer storage management technology. For example, by associating a plurality of primary flags 190A-C in metadata 180 of a thin-provisioned volume 120 with storage blocks 130A-C of the volume 120, and by setting a flag 190A corresponding to an individual block 130A when data is written to the individual block 130A, executable processes may subsequently read the status of the flag 190A to determine conclusively that data in the block 130A do not necessarily reflect the base state. This provides a fast, efficient and computationally inexpensive means for determining whether or not the copy of the base state residing on the volume 120 has been modified or added to after the copy has been made. The disclosed systems and methods are, in particular, significantly more efficient than brute force approaches for determining subsequent changes to cloned base states. Brute force approaches generally involve reading each block 130A on the thin-provisioned volume 120 and comparing the data retrieved individually with the source volume containing the original virtual machine base state.

The primary flags 190A-C that may be included in the disclosed systems and methods may advantageously be stored in the metadata 180 of a thin-provisioned volume 120 in space efficient form. For example, the primary flags 190A-C may be implemented using 1-bit flags arranged in a table data structure in the metadata 180. In an example where the thin-provisioned volume 120 has a storage capacity of 100 GB and contains a total of 1,638,400 storage blocks 130 (each storage block 130 having an individual storage capacity of 64 KB), a table of 1,638,400 1-bit primary flags will consume a total of approximately 200 KB of the metadata 180 and occupy four storage blocks 130. The primary flags 190A-C in this example would, therefore, only consume approximately 0.0002% of the 100 GB storage capacity of the volume 120. In another example, primary flags 190A-C may be implemented using multibit flags (e.g., trinary, quaternary, octal), which may accordingly be less space efficient but may provide additional state information for data in the volume 120.

The disclosed solution is necessarily rooted in computer technology to overcome a problem specifically arising in the realm of virtual storage device management, and more specifically to managing copies of virtual machine base states, by addressing a challenge associated with, for example, migrating copies of data stored on a thin-provisioned volumes 120 by providing a technical process of tracking subsequent modifications to such copies. By providing a fast and space-efficient means for determining inconsistencies between original and cloned versions of virtual disk base states, the systems and methods provide a facility that a broad variety of hypervisor-related processes, and other virtual operating system level processes, may utilize and take advantage of. For example, when migrating data on the thin-provisioned volume 120 to a target storage device, an executable process may iterate through the primary flags 190A-C in the metadata 180 to determine which of the blocks 130A-C have been modified and no longer reflect the base state. The process may then advantageously read the data held on the relevant blocks 130A-C and merge these data with the virtual machine base state on the target volume to complete the migration without unnecessary computation, data transfer, and/or other overhead. Thus, the present disclosure provides a particular way to address a technical problem and improves upon the existing technological processes for tracking and managing data writes to cloned virtual disk base states. The solution enables differences between original and cloned base states to be recorded, queried and managed in a fast and scalable manner and allows for a performance of virtual hardware utilization not previously performable.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a storage device with at least one volume, wherein the at least one volume has a physical capacity and a virtual capacity, the virtual capacity being larger than the physical capacity, and a plurality of storage blocks, wherein each storage block in the plurality of storage blocks is configured to store a copy of at least part of a base state of a virtual machine;
a processor in communication with the storage device and a target volume; and
metadata stored on the at least one volume, the metadata including a plurality of primary flags, wherein each primary flag in the plurality of primary flags is associated with at least one individual storage block in the plurality of storage blocks and is set initially to a first state that signifies that data stored on the relevant individual storage block form at least part of the base state of the virtual machine,
wherein in response to an instruction to write data to the at least one volume, the processor executes to:
write the data to at least a destination block in the plurality of storage blocks; and
set a relevant primary flag in the plurality of primary flags that is associated with the destination block to a second state that signifies that data stored on the destination block no longer form part of the base state of the virtual machine, and
wherein in response to a copy instruction, the processor further executes to copy data stored on at least a first storage block in the plurality of storage blocks to the target volume, wherein a primary flag in the plurality of primary flags associated with the first storage block is set to the second state.

2. The system of claim 1, wherein the metadata further includes a secondary flag, the secondary flag being configured to indicate that the metadata includes the plurality of primary flags.

3. The system of claim 2, wherein in response to the instruction to write the data to the at least one volume, the processor further executes to perform a lookup operation to determine a value of the secondary flag before writing the data to the at least one volume.

4. The system of claim 1, wherein the metadata further includes a reference pointer, wherein the reference pointer identifies a source storage device storing the base state of the virtual machine.

5. The system of claim 4, wherein the reference pointer is a physical or virtual address of the source storage device.

6. A method comprising:
copying a base state of a virtual machine from a source volume to a destination volume, wherein the destination volume has a physical capacity and a virtual capacity, the virtual capacity being larger than the physical capacity, and includes a plurality of storage blocks;
in response to an instruction to write data to the destination volume:
writing the data to at least a first storage block in the plurality of storage blocks; and
setting a primary flag included in metadata stored on the destination volume from a first state to a second state, wherein the primary flag is associated with the first storage block;
subsequently reading a state of the primary flag to determine that data in the first storage block no longer form part of the base state of the virtual machine; and
setting a secondary flag included in the metadata to signify that the metadata includes the primary flag.

7. The method of claim 6, further comprising writing a reference pointer in the metadata, wherein the reference pointer identifies the source volume.

8. The method of claim 7, wherein the reference pointer is a physical or virtual address of the source volume.

9. The method of claim 6, further comprising iterating through the plurality of storage blocks and, for each individual storage block in the plurality of storage blocks, reading a state of a primary flag included in the metadata that is associated with the relevant individual storage block to determine whether or not data stored in the relevant individual storage block forms part of the base state of the virtual machine.

10. The method of claim 6, further comprising forming a merged data set by combining together:

data in each individual storage block in the plurality of storage blocks, wherein a primary flag included in the metadata that is associated with the relevant individual storage block is set to the second state; and
data forming the base state of the virtual machine.

11. The method of claim 10, wherein the merged data set is formed on a target volume.

12. The method of claim 11, wherein the target volume is the source volume.

13. The method of claim 6, further comprising:
in response to a copy instruction, copying data stored on at least the first storage block in the plurality of storage blocks to a target volume.

14. A computer-readable non-transitory medium storing executable instructions, which when executed by a computer system, cause the computer system to:
copy a base state of a virtual machine from a source volume to a destination volume, wherein the destination volume has a physical capacity and a virtual capacity, the virtual capacity being larger than the physical capacity, and includes a plurality of storage blocks;
in response to an instruction to write data to the destination volume:
write the data to at least a first storage block in the plurality of storage blocks; and
set a primary flag included in metadata stored on the destination volume from a first state to a second state, wherein the primary flag is associated with the first storage block;
subsequently read a state of the primary flag to determine that data in the first storage block no longer form part of the base state of the virtual machine; and
set a secondary flag included in the metadata to signify that the metadata includes the primary flag.

15. The computer-readable non-transitory medium of claim 14, wherein the executable instructions further cause the computer system to, in response to a copy instruction, copy data stored on at least the first storage block in the plurality of storage blocks to a target volume.

16. The computer-readable non-transitory medium of claim 14, wherein the secondary flag is configured to indicate that the metadata includes a plurality of primary flags.

17. The computer-readable non-transitory medium of claim 16, wherein the executable instructions further cause the computer system to, in response to the instruction to write the data to the destination volume, perform a lookup operation to determine a value of the secondary flag before writing the data to the destination volume.

18. The computer-readable non-transitory medium of claim 14, wherein the metadata further includes a reference pointer, wherein the reference pointer identifies a source storage device storing the base state of the virtual machine.

19. The computer-readable non-transitory medium of claim 18, wherein the reference pointer is a physical or virtual address of the source storage device.

20. The computer-readable non-transitory medium of claim 14, wherein the executable instructions further cause the computer system to write a reference pointer in the metadata, wherein the reference pointer identifies the source volume.

* * * * *